United States Patent
Sundareswaran

(10) Patent No.: US 8,618,838 B2
(45) Date of Patent: Dec. 31, 2013

(54) INTEGRATED CIRCUIT HAVING A STANDARD CELL AND METHOD FOR FORMING

(75) Inventor: Savithri Sundareswaran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 6 days.

(21) Appl. No.: 13/233,393

(22) Filed: Sep. 15, 2011

(65) Prior Publication Data

US 2013/0069691 A1    Mar. 21, 2013

(51) Int. Cl.
*H03K 19/00*    (2006.01)

(52) U.S. Cl.
USPC .............................................. 326/103; 326/27

(58) Field of Classification Search
USPC ................... 326/26, 27, 37, 38, 101–103
See application file for complete search history.

(56) References Cited

U.S. PATENT DOCUMENTS

| | | | |
|---|---|---|---|
| 7,932,542 B2* | 4/2011 | Berthold et al. | 257/202 |
| 8,176,445 B1* | 5/2012 | Qian | 716/52 |
| 2004/0080016 A1* | 4/2004 | Houston | 257/500 |
| 2004/0083440 A1* | 4/2004 | Houston | 716/8 |
| 2007/0089077 A1* | 4/2007 | Sumikawa | 716/6 |
| 2008/0186059 A1* | 8/2008 | Nozoe | 326/103 |
| 2008/0283871 A1* | 11/2008 | Hamada | 257/204 |
| 2008/0296628 A1* | 12/2008 | Kaneko | 257/202 |
| 2010/0169846 A1* | 7/2010 | Gupta et al. | 716/2 |
| 2010/0169847 A1* | 7/2010 | Gupta et al. | 716/2 |
| 2011/0252391 A1* | 10/2011 | Arimoto | 716/113 |
| 2011/0298010 A1* | 12/2011 | Menut et al. | 257/204 |

* cited by examiner

*Primary Examiner* — Don Le
(74) *Attorney, Agent, or Firm* — Joanna G. Chiu; James L. Clingan, Jr.

(57) ABSTRACT

An integrated circuit includes a first plurality of transistors and a second plurality of transistors coupled together to form a standard cell that performs a logic function. Each of the first plurality of transistors is more critical to a speed of operation of the standard cell than any of the transistors of the second plurality of transistors. Each of the first plurality of transistors has a gate length longer than a gate length of any of the transistors of the second plurality of transistors.

16 Claims, 4 Drawing Sheets

INTEGRATED CIRCUIT HAVING A STANDARD CELL AND METHOD FOR FORMING

BACKGROUND

1. Field

This disclosure relates generally to integrated circuits, and more specifically, to integrated circuits using standard cells.

2. Related Art

Standard cells are basic building blocks in the design of integrated circuits. An integrated circuit typically includes a variety of different standard cells. A standard cell is a group of transistors and interconnect structures which provide a particular function, such as a Boolean logic function (e.g. AND, OR, XOR, XNOR, NAND, NOR, inverters, etc.) or a storage function (e.g. flip flop, latch, etc.). Standard cells may also provide more complex functions, such as an adder, a multiplexor (MUX), etc. The functionality of a particular cell is fully customizable. Standard cells also typically have a fixed height and variable width which allows for easy placement in rows within a circuit design.

As integrated circuits continue to increase in complexity, a greater number of standard cells is used. Subtle changes to standard cells can play an important role in the overall integrated circuit performance and yield. Therefore, the area constraints and performance characteristics for a standard cell become increasingly important. For example, any increase in area of a standard cell results in an increased area of the integrated circuit, which is undesirable. Also, variability in performance and leakage of a standard cell can significantly contribute to yield loss. Therefore, a need exists for standard cells having an increased robustness without increasing circuit area.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Integrated circuits commonly use standard cells in their design. (Note that, as used herein, a "standard cell" may simply be referred to as a "cell".) The variability in delay and leakage in a standard cell can be a significant contributor to yield loss. Therefore, in one embodiment, a more robust standard cell is achieved in which variability in delay and leakage is reduced, but without impacting the area or routing of the standard cells. Furthermore, this robust standard cell results in reduced worst-case delay for a given yield. In a standard cell, a subset of transistors is considered critical transistors which are most sensitive to delay variations with respect to process variations. For each critical transistor, the gate length is increased by a predetermined amount. This increase in gate length results in increased delay of the standard cell, but does not increase cell area or impact design rules. Therefore, in this robust standard cell, the critical transistors each have a gate length that is greater than the gate length of the remaining transistors. By increasing or upsizing the gate length, delay of the standard cell is increased; however, delay and leakage variations across the integrated circuit or across multiple parts are reduced. By reducing delay and leakage variations, the probability of a particular cell within a circuit design to have a target delay or target leakage is increased. Therefore, even though increasing gate length of critical transistors in a standard cell results in an increased delay for that cell, overall delay or leakage of a circuit at a given yield target may be decreased.

Figure 1:
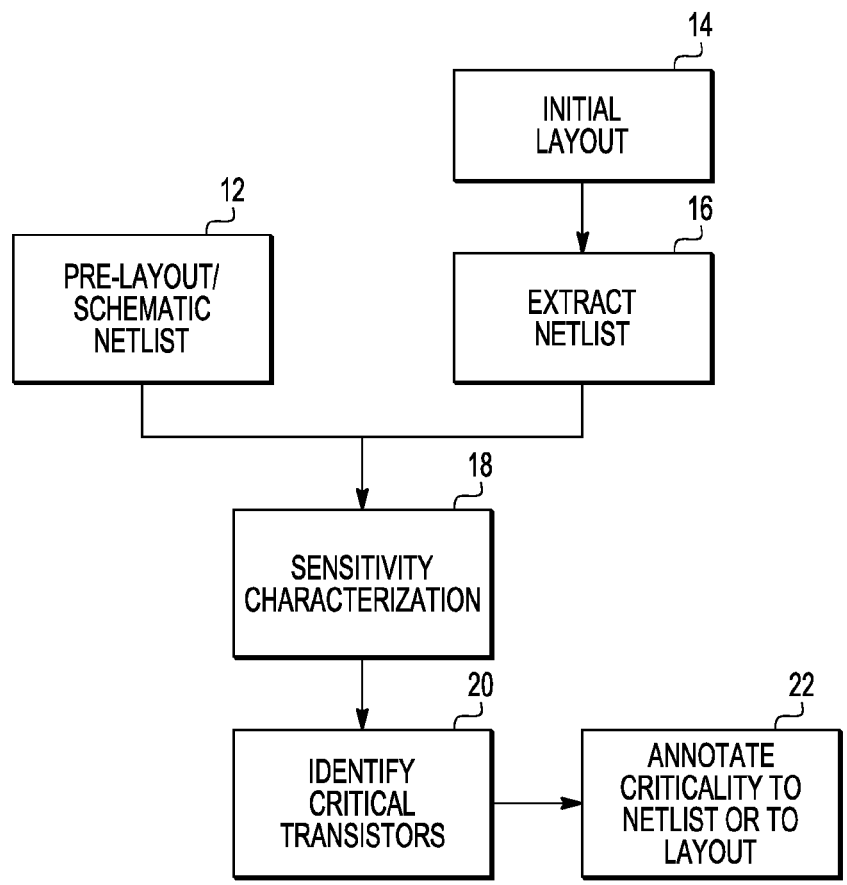
FIG. 1 illustrates a method for annotating critical transistors in accordance with an embodiment of the present invention.
Figure 2:
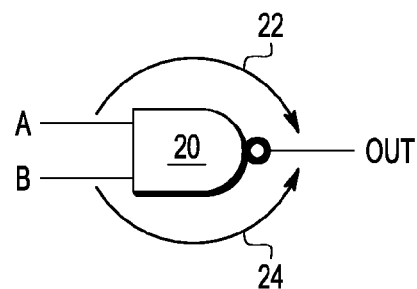
FIG. 2 illustrates an example of multiple timing arcs of a NAND cell.

FIG. 1 illustrates a method 10 for annotating critical transistors in accordance with an embodiment of the present invention. In block 12, a pre-layout/schematic netlist for a circuit is provided. In block 14, an initial circuit layout is provided from which a circuit netlist can be extracted (block 16). Therefore, a netlist (either pre-layout or extracted from an existing layout) is provided to block 18 for sensitivity characterization. Sensitivity characterization is used to characterize how sensitive a circuit element is to delay variations with respect to process variations. Method 10 then proceeds to block 20 in which the sensitivity characterization of block 18 is used to identify critical transistors. As used herein, critical transistors are those transistors within a circuit (e.g. within a standard cell) which are most sensitive to delay variations with respect to process variations. These process variations may include, for example, lithography induced variations, random dopant/threshold voltage variations, implant dosage variations, etc. Therefore, a transistor that is identified as critical is more critical to a speed of operation of the cell than the other transistors in the cell. In identifying critical transistors, the sensitivity across all arcs may be considered. For example, FIG. 2 illustrates a NAND gate 20 which has a first arc 22 which represents a timing path from input A to output OUT and a second arc 24 which represents a timing path from input B to output OUT. Therefore, one or more transistors within NAND gate 20 may be a part of both arcs 22 and 24 and one or more other transistors may be a part of only one of arcs 22 and 24. Therefore, multiple arcs are considered when determining which transistors within a standard cell is most sensitive to delay variations. Once the one or more critical transistors are identified, method 10 proceeds to block 22 in which the criticality is annotated to the schematic netlist or layout. For example, the top one or more most critical transistors can be marked in either the netlist or layout. In one example, a marker layer is created for the critical transistors which propagate to the final design. In one embodiment, this marker layer, is used during optical proximity correction (OPC).

Figure 3:
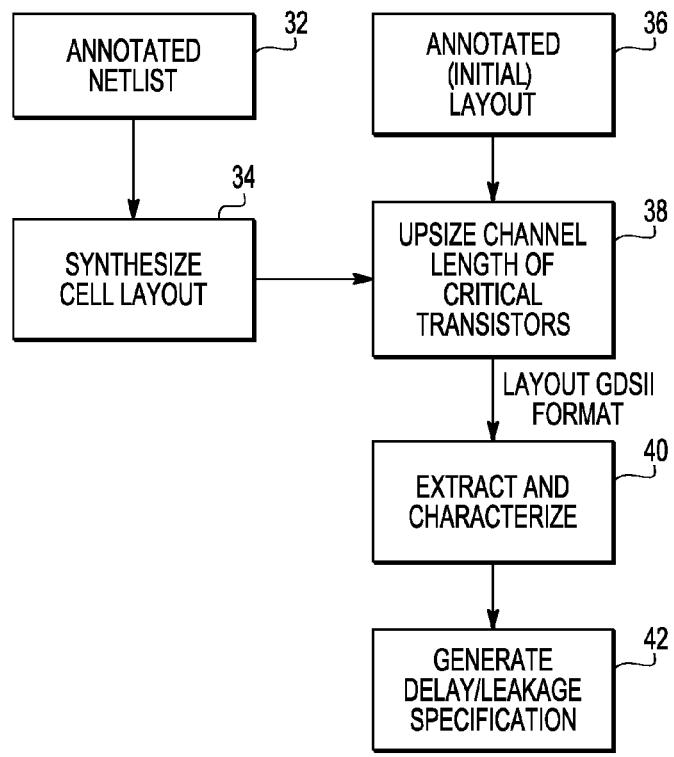
FIG. 3 illustrates a method of generating a standard cell layout, in accordance with an embodiment of the present invention.

FIG. 3 illustrates a method 30 of generating a standard cell layout, in accordance with an embodiment of the present invention. Therefore, method 30 may be performed for each standard cell within a circuit design. In the case in which a netlist was annotated in FIG. 1 to mark the critical transistors, the annotated netlist is provided in block 32 and method 30 proceeds to block 34 in which a cell layout is synthesized using the annotated netlist. In one embodiment, the cell layout is synthesized in block 34 without taking into consideration the annotations. Method 30 then proceeds to block 38 in which the channel length of each transistors marked as a critical transistors by the annotations is upsized. Alternatively, in the case in which a layout was annotated in FIG. 1 to mark the critical transistors, the annotated initial layout (the layout which does not include any changes with respect to the critical transistors) is provided in block 36 and the method proceeds to block 38 in which the channel length of each critical transistor marked as such by the annotations is upsized. Therefore, the updated layout, in which those transistors previously identified as critical transistors have an increased gate length, is provided to block 40 for extraction and characterization. In one embodiment, the layout is provided in a GDSII format. After extraction and characterization, method 30 proceeds to block 42 in which the delay/leakage specification may be generated for the modified layout. As will be described below, due to the increase in gate lengths, which results in a greater delay for the standard cell, the delay and leakage specification improves. Note that the resulting layout may be used to form the resulting standard cell (such as during manufacture of the integrated circuit containing the standard cell).

Figure 4:
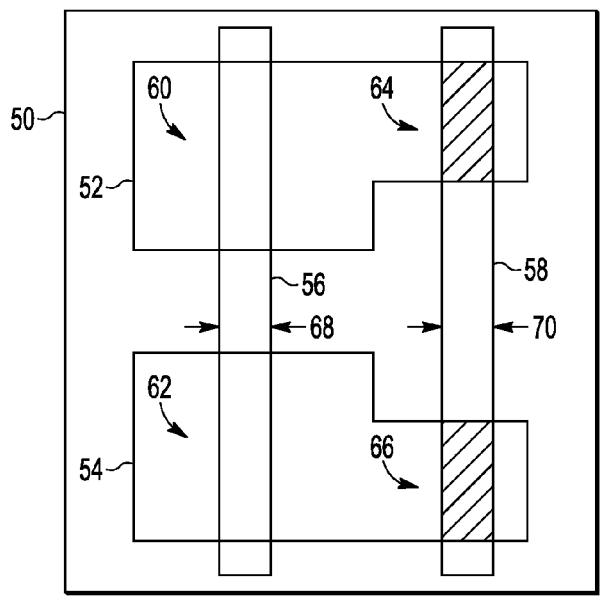
FIG. 4 illustrates an exemplary standard cell having critical transistors.

FIG. 4 illustrates a standard cell layout 50 in accordance with one embodiment of the present disclosure. Cell 50 includes active areas 52 and 54, and gate structures 56 and 58, in which transistors are formed at the intersections of the gate structures and active areas. Therefore, cell 50 includes transistors 60, 64, 62, and 66. Transistor 60 corresponds to the intersection of gate 56 and active area 52, transistor 64 corresponds to the intersection of gate 58 and active area 52, transistor 62 corresponds to the intersection of gate 56 and active area 54, and transistor 66 corresponds to the intersection of gate 58 and active area 54. Standard cell layout 50 may perform any type of logical or sequential function. For example, the standard cell of FIG. 4 may correspond to a multiplexer or an AND-OR logic gate. Gate 56 has a gate length of 68 and gate 58 has a gate length of 70. In layout 50 of FIG. 4, critical transistors are indicated by the hashed lines. Therefore, transistors 64 and 66 are annotated as critical transistors which, as compared to transistors 60 and 62, are more sensitive to delay variations due to process variations. That is, transistors 64 and 66 are identified as more critical to a speed of operation of the cell than transistors 60 and 62. Note that layout 50 of FIG. 4 is the initial or beginning layout (such as the layout provided in block 36 or synthesized in block 34 of FIG. 3) in which no upsizing of the gate lengths of the critical transistors has been done. Therefore, in layout 50, gate lengths 68 and 70 are the same.

Figure 5:
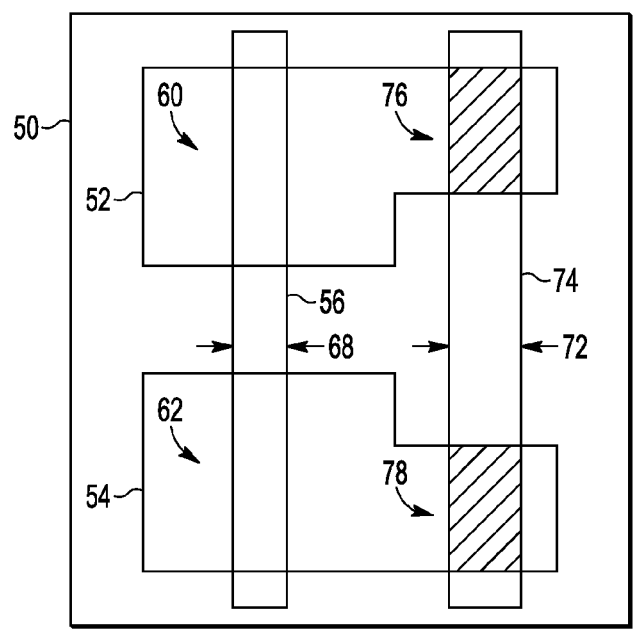
FIG. 5 illustrates an exemplary standard cell whose critical transistors have their gate lengths upsized.

FIG. 5 illustrates layout 50 after gate length upsizing in accordance with one embodiment of the present disclosure. Therefore, since both transistors 64 and 66 were identified as critical transistors, the gate length of each of these transistors is increased by a predetermined amount. Therefore, layout 50 of FIG. 5 includes transistor 76 which corresponds to previous transistor 64 whose gate length has been increased and transistor 78 which corresponds to previous transistor 66 whose gate length has been increased. Since both transistors 76 and 78 share a gate structure, this upsizing is accomplished by increasing a gate length 72 of gate 74. Therefore, gate length 72 is now greater than gate length 68 of gate 56. As a result of the increased gate length, the cell of FIG. 5 has a reduced delay variation and reduced leakage variation as compared to the cell of FIG. 4, without the gate length upsizing.

Note that, in one embodiment, the standard cell may include more transistors than those illustrated, and gate length 72 would be greater than the gate length of any other transistor in the cell. Also, in one embodiment, the gate length of each critical transistor within a standard cell has a gate length of a first dimension while each of the other remaining, non-critical transistors within the cell have a gate length of a second dimension, which is less than the first dimension.

Increasing the gate lengths of critical transistors does not result in increased area of the standard cell layout. The gate lengths can be increased such that design rules are not impacted. Typically, sufficient area is available on one or both sides of the gate length to perform the gate length upsizing without violating any design rules. In this manner, total area of the cell layout remains the same and no changes to the routing are needed. However, if gate lengths of all transistors in a cell were to be increased, the standard cell may require more area, which would be undesirable. Therefore, through identification of critical transistors and upsizing the gate length of critical transistors only, robust standard cells can be achieved without increasing area.

Figure 6:
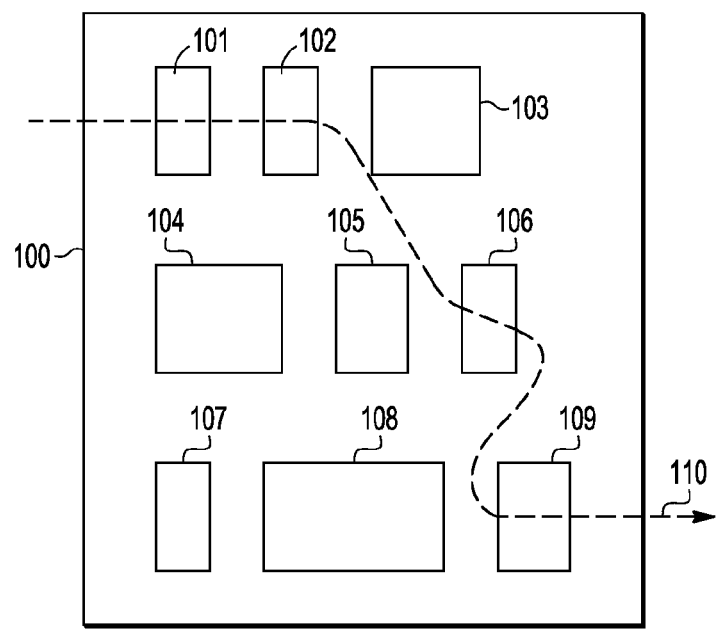
FIG. 6 illustrates an exemplary integrated circuit having a plurality of standard cells.

FIG. 6 illustrates an integrated circuit 100 which includes a plurality of standard cells 101-109. The resulting layouts generated in FIG. 3 may be used to form integrated circuit 100. Standard cell layout 50 of FIG. 5 may correspond to any of the standard cells of circuit 100. Integrated circuit 100 may include one or more critical timing paths which determine the total delay through circuit 100. A critical timing path 110 of circuit 100 goes through standard cells 101, 102, 106, and 109. In one embodiment, critical transistors of each of standard cells 101-109 have been identified and their gate lengths upsized, as was described above. Alternatively, only a subset of standard cells 101-109 may include critical transistors whose gate lengths were upsized. However, by upsizing the gate length of critical transistors within a standard cell (as was shown, for example, in reference to standard call layout 50), delay through the timing path is increased. However, the increase in gate length also reduces both the delay and leakage variability of the timing path. This reduction in delay and leakage variability allows for the worst case delay of a timing path, such as timing path 110, to be reduced.

Figure 7:
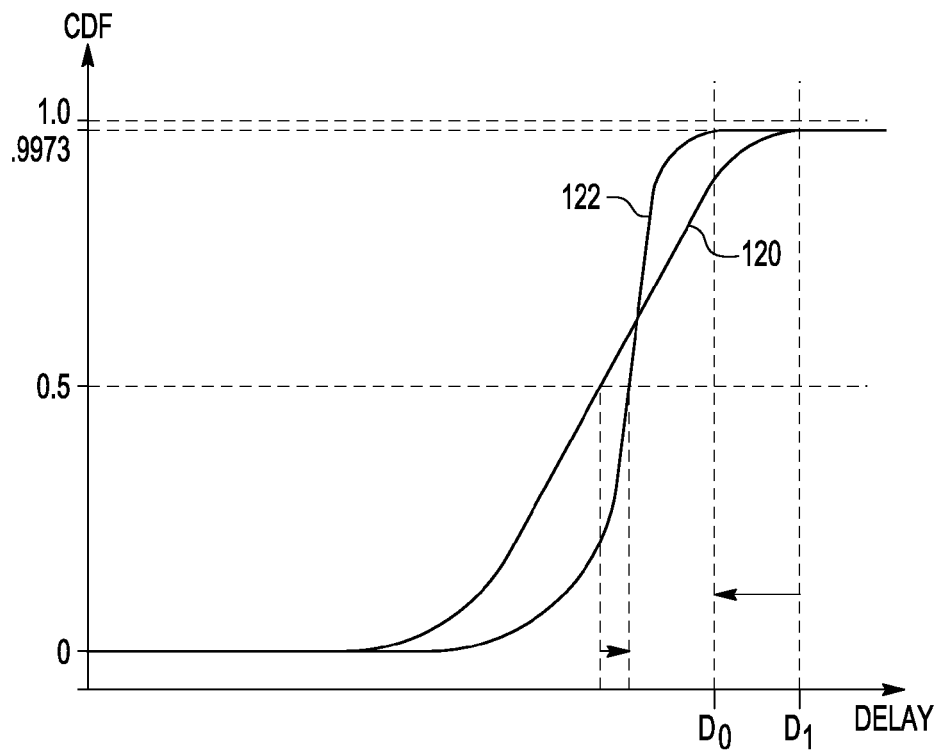
FIG. 7 illustrates exemplary cumulative distribution function (CDF) curves.

FIG. 7 illustrates exemplary cumulative distribution function (CDF) curves 120 and 122 which illustrates CDF of an integrated circuit with respect to circuit delay. In the illustrated embodiment, curves 120 and 122 represent delay across a same integrated circuit or, alternatively, across a number of integrated circuits (such as of various integrated circuits within a particular lot). Curve 120 corresponds to a circuit design in which no gate length upsizing of the critical transistors has been performed. Curve 122 corresponds to a circuit design in which gate length upsizing of the critical transistors has been performed, as described above. With curve 120, a 99.73 percentile point (corresponding to a 3 sigma variation from a center point of distribution over process variations) occurs at delay D0. That is, it indicates the probability that 99.73% of the integrated circuits will have a specified worst case delay of D0. However, by reducing delay and leakage variation of the integrated circuit by increasing the gate lengths of critical transistors within standard cells, curve 120 is tightened with respect to curve 122. That is, curve 122 is now sharper with reduced variation as compared to curve 120. With curve 122, the 99.73 percentile point (corresponding to a 3 sigma variation from a center point of distribution over process variations) occurs at delay D1. That is, probability indicates that 99.73% of the integrated circuits will have a specified worst case delay of D1, which is less than D0. Note that curve 122 crosses a CDF of 0.5 at a later delay as compared to curve 120. However, although the median (50 percentile point) of curve 122 has been shifted to a greater delay with respect to curve 120, the greater "tightness" of curve 122 allows for an improved delay specification (a reduced worst case delay) as compared to curve 120. Therefore, although critical transistors were made slower by increasing their gate lengths, the specified slowest speed of the circuit is reduced. Additionally, increasing the gate-lengths of critical transistors reduces both median leakage and leakage variations of the circuit. In this manner, the integrated circuits with the modified gate lengths can be specified at a lower target delay and lower target leakage.

In the embodiment described in reference to FIG. 3, the gate lengths of critical transistors was upsized when generating the standard cell layout. However, in alternate embodiments, the upsizing may be performed at various different stages of processing. For example, in one embodiment, a marker layer (as described above) which indicates the annotated critical transistors is used during OPC or mask preparation to create the gate length upsizing on the critical transistors.

Figure 8:
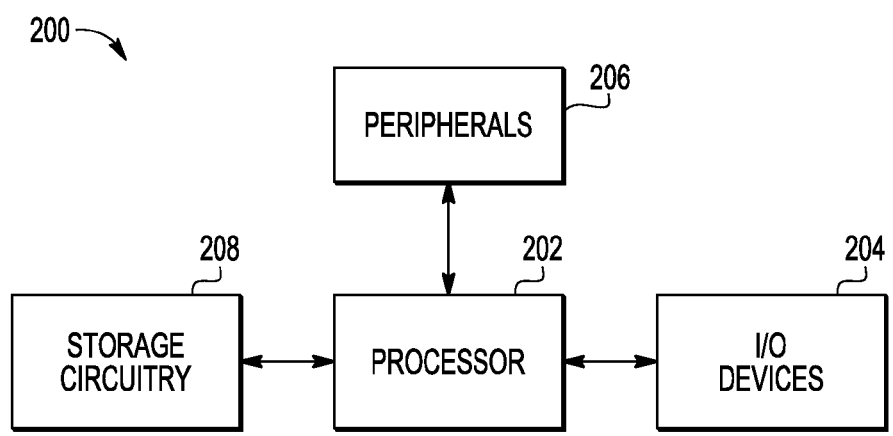
FIG. 8 illustrates an exemplary data processing system.

FIG. 8 illustrates a data processing system 200 which includes a processor 202, bidirectionally coupled to each of storage circuitry 203, input/output (I/O) devices 204, and peripherals 206. System 200 may be used to perform the methods of FIG. 1 or FIG. 3. For example, the schematic netlists and initial layout of FIG. 1, the annotated netlist of FIG. 3, the annotations of FIG. 1, or the output layout of FIG. 3 may be stored in storage circuitry 208. Processor 202 may access I/O devices 204, peripherals 206, and storage circuitry 208 as needed to implement the methods described herein. Software executing on system 200 may be used to perform all or parts of the methods described herein, and the software may be received from computer readable media such as storage circuitry 208 or from other media. Such computer readable media may be permanently, removably or remotely coupled to an information processing system such as system 200. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

By now it should be appreciated that a method to reduce variability and leakage of an integrated circuit has been provided by identifying, within a standard cell, those critical transistors which are most sensitive to delay variations with respect to process variations and increasing the gate length of those critical transistors. While this increases the nominal delay of the standard cell itself, leakage of the standard cell is reduced and delay and leakage variability is reduced. This may result in improved performance and leakage yield. For example, the worst case speed that may be specified for a resulting integrated circuit may now be lower than what could have been specified by not increasing the gate lengths (thus not increasing the delay) of the standard cell.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 8 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one embodiment, system 200 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, the annotations to mark critical transistors may be performed in a variety of ways. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes an integrated circuit having a first plurality of transistors and a second plurality of transistors coupled together to form a standard cell that performs a logic function; wherein: each of the first plurality of transistors is more critical to a speed of operation of the standard cell than any of the transistors of the second plurality of transistors; and each of the first plurality of transistors has a gate length longer than a gate length of any of the transistors of the second plurality of transistors. Item 2 includes the integrated circuit of item 1, wherein the logic function of the standard cell is as a multiplexer. Item 3 includes the integrated circuit of item 1, wherein the logic function of the standard cell is as an AND-OR logic gate. Item 4 includes the integrated circuit of item 1, wherein the gate lengths of the first plurality of transistors are all a first dimension. Item 5 includes the integrated circuit of item 1, wherein the gate lengths of the second plurality of transistors are all a second dimension. Item 6 includes the integrated circuit of item 1, wherein critical to the speed of operation means degree of speed variation with respect to process variations. Item 7 includes the integrated circuit of item 6, wherein process variations include variation in implant dosage. Item 8 includes the integrated circuit of item 6, wherein the first plurality of transistors vary in speed with process variations less than the second plurality of transistors vary in speed with process variations. Item 9 includes the integrated circuit of item 8, wherein at a three sigma variation from a center point of distribution over process variations, a slowest speed of the first plurality of transistors over process variations is faster with the longer gate length than if the first plurality of transistors had the same gate length as the second plurality of transistors. Item 10 includes the integrated circuit of item 1, wherein if all of the transistors of the second plurality of transistors had the same gate length as the first plurality of transistors, the standard cell would require more area. Item 11 includes the integrated circuit of item 1, wherein a current leakage of the standard cell is less than if the first plurality of transistors were reduced to the same gate length as the second plurality of transistors. Item 12 includes the integrated circuit of item 1, wherein a variation in leakage of the standard cell is less than if the first plurality of transistors were reduced to the same gate length as the second plurality of transistors.

Item 13 includes a method of deriving a resulting standard cell from a beginning standard cell having a plurality of transistors having a first gate length, the method including identifying transistors that are most critical to speed of the beginning standard cell; and altering a layout of the transistors that are most critical to speed by increasing the gate length of the transistors that are most critical to speed from the first gate length to a second gate length to form a layout of the resulting standard cell; and using the layout of the resulting standard cell to form the resulting standard cell. Item 14 includes the method of item 13, wherein the step of identifying is further characterized by performing a sensitivity characterization of the beginning standard cell. Item 15 includes the method of item 13, wherein the step of identifying is further characterized by the most critical to speed meaning having a speed that is most sensitive to process variations. Item 16 includes the method of item 13, wherein the beginning standard cell has higher current leakage than the resulting standard cell. Item 17 includes the method of item 13, wherein the beginning standard cell has higher current leakage variation than the resulting standard cell. Item 18 includes the method of item 13, wherein area and routing of the resulting standard cell is the same as for the beginning standard cell. Item 19 includes the method of item 13, wherein the center point of the distribution for the resulting standard cell is slower than the center point of distribution for the beginning standard cell.

Item 20 includes an integrated circuit having a plurality of standard cells wherein each standard cell performs one a plurality of logic functions, each standard cell has a plurality of critical transistors whose speeds of operation are most sensitive to process variations, and the critical transistors have a longer gate length than all transistors of the plurality of standard cells that are not critical transistors.

What is claimed is:

1. An integrated circuit, comprising:
a first plurality of transistors and a second plurality of transistors coupled together to form a standard cell that performs a logic function;
wherein:
each of the first plurality of transistors is more critical to a speed of operation of the standard cell than any of the transistors of the second plurality of transistors;
each of the first plurality of transistors has a gate length longer than a gate length of any of the transistors of the second plurality of transistors;
the gate lengths of the first plurality of transistors are all a first dimension; and
the gate lengths of the second plurality of transistors are all a second dimension.

2. The integrated circuit of claim 1, wherein the logic function of the standard cell is as a multiplexer.

3. The integrated circuit of claim 1, wherein the logic function of the standard cell is as an AND-OR logic gate.

4. The integrated circuit of claim 1, wherein critical to the speed of operation means degree of speed variation with respect to process variations.

5. The integrated circuit of claim 4, wherein process variations include variation in implant dosage.

6. The integrated circuit of claim 4, wherein the first plurality of transistors vary in speed with process variations less than the second plurality of transistors vary in speed with process variations.

7. The integrated circuit of claim 6, wherein at a three sigma variation from a center point of distribution over process variations, a slowest speed of the first plurality of transistors over process variations is faster with the longer gate length than if the first plurality of transistors had the same gate length as the second plurality of transistors.

8. The integrated circuit of claim 1, wherein if all of the transistors of the second plurality of transistors had the same gate length as the first plurality of transistors, the standard cell would require more area.

9. The integrated circuit of claim 1, wherein a current leakage of the standard cell is less than if the first plurality of transistors were reduced to the same gate length as the second plurality of transistors.

10. The integrated circuit of claim 1, wherein a variation in leakage of the standard cell is less than if the first plurality of transistors were reduced to the same gate length as the second plurality of transistors.

11. A method of deriving a resulting standard cell from a beginning standard cell having a plurality of transistors having a first gate length, comprising:
identifying transistors that are most critical to speed of the beginning standard cell; and
altering a layout of the transistors that are most critical to speed by increasing the gate length of the transistors that are most critical to speed from the first gate length to a second gate length to form a layout of the resulting standard cell; and
using the layout of the resulting standard cell to form the resulting standard cell, wherein the center point of the distribution for the resulting standard cell is slower than the center point of distribution for the beginning standard cell.

12. The method of claim 11, wherein the step of identifying is further characterized by performing a sensitivity characterization of the beginning standard cell.

13. The method of claim 11, wherein the step of identifying is further characterized by the most critical to speed meaning having a speed that is most sensitive to process variations.

14. The method of claim 11, wherein the beginning standard cell has higher current leakage than the resulting standard cell.

15. The method of claim 11, wherein the beginning standard cell has higher current leakage variation than the resulting standard cell.

16. The method of claim 11, wherein area and routing of the resulting standard cell is the same as for the beginning standard cell.

* * * * *